June 7, 1932. M. RIVKIN 1,862,429
LOCOMOTIVE DRAWBAR
Filed June 20, 1930
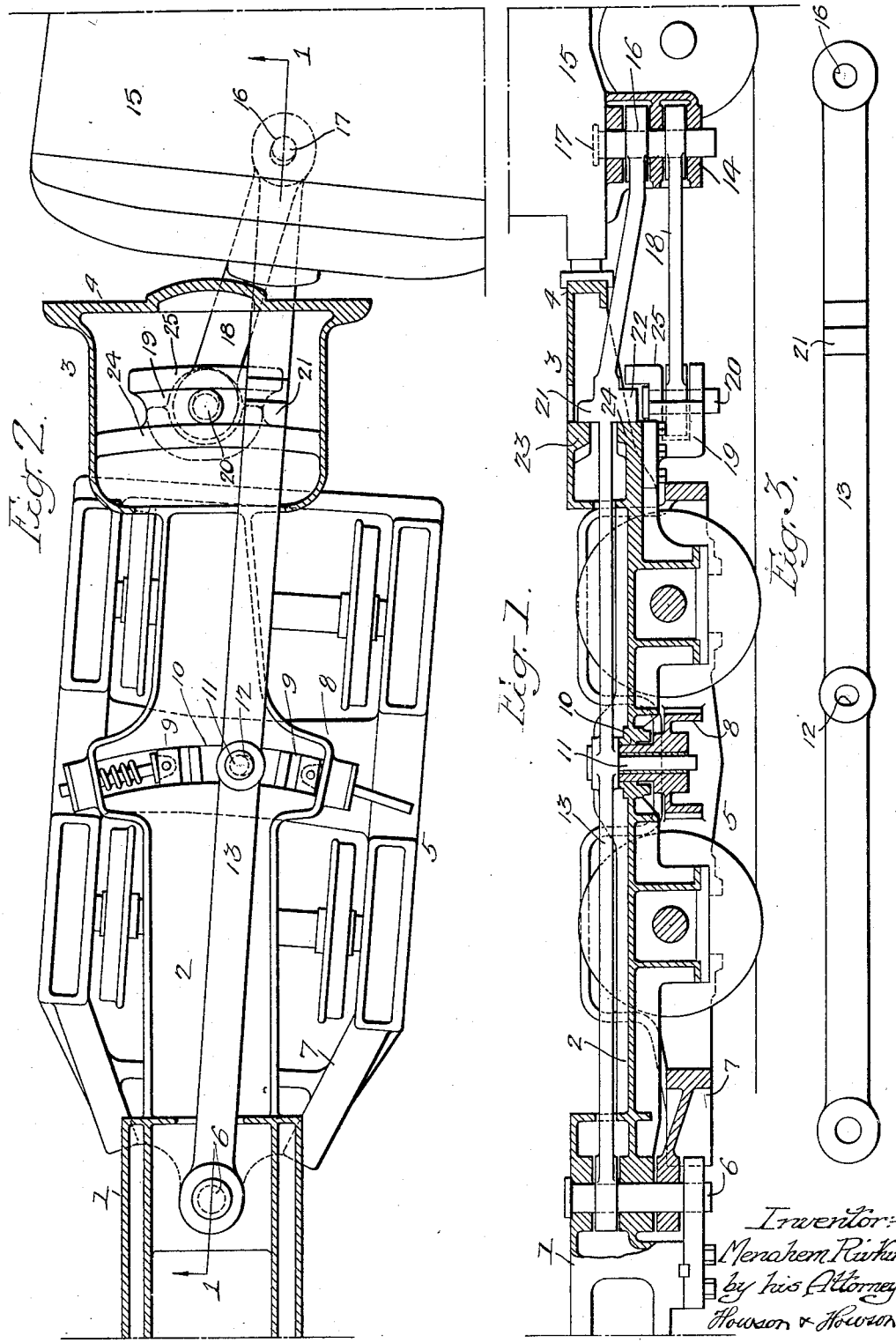

Patented June 7, 1932

1,862,429

UNITED STATES PATENT OFFICE

MENAHEM RIVKIN, OF PHILADELPHIA, PENNSYLVANIA

LOCOMOTIVE DRAWBAR

Application filed June 20, 1930. Serial No. 462,610.

One object of my invention is to so construct a locomotive and its draw bar that the draw bar can be pivoted to the main frame directly back of the rear driving wheels, and in front of the rear truck, avoiding the angularity in pulling the train around curves.

A further object of the invention is to so construct the draw bar that it will be connected to the center bearing of the rear truck.

A still further object of the invention is to so design the draw bar that it will move laterally past a segmental bearing surface, providing safety means which will prevent the draw bar buckling when the engine is pushing; and to provide means for engaging the draw bar at this point in the event of the bar breaking in front of this bearing point.

In the accompanying drawing:—

Fig. 1 is a longitudinal sectional view on the line 1—1, Fig. 2, illustrating the improved draw bar in connection with the rear end frame and rear truck of a locomotive;

Fig. 2 is a plan view showing part of the main frame of the truck and the foot plate in section; and Fig. 3 is a detached plan view of the draw bar.

1 is the main frame of the locomotive terminating in the present instance directly back of the rear driving wheels. 2 is a rear end extension of the main frame. This extension is preferably narrower than the main frame and has at its rear end the foot plate structure 3 and bumper 4. 5 is a four-wheel truck pivoted to the main frame by a pivot pin 6 which passes through the radius bar 7 of the truck. At the center of the truck is a cross tie 8 having blocks 9 which travel in the segmental slot 10 of the extension 2 of the frame. In the center of the cross tie 8 is a center pin bearing 11 which extends through the slot 10 and into an elongated opening 12 in the draw bar 13, which is mounted directly above the extension 2 of the main frame, and is pivoted to the main frame by the pivot pin 6 that couples the truck to the main frame, but this arrangement may be modified without departing from the essential features of the invention.

The draw bar extends to the draw head 14 at the front end of the tender 15, and is perforated at 16 for the coupling pin 17, which also passes through a safety bar 18, which is coupled by a pin 20 to a draw head 19 on the rear end extension 2 of the main frame of the locomotive. In the present instance this draw head 19 is made separate from the extension of the main frame and is bolted thereto as shown in Fig. 1, but it may be an integral part of the frame without departing from the essential features of the invention. On the draw bar are shoulders 21 and 22 which travel over segmental abutments 23 and 24, respectively, forming an integral part of the rear end extension of the frame. These abutments prevent the draw bar from buckling when the engine is pushing and the draw bar is under compression strains. On the draw head 19 is an upright projection 25, which extends back of the shoulder 22 of the draw bar, and this acts as a safety means in case the draw bar should break in front of the shoulders.

The particular construction of the frame of the locomotive shown in the drawing, as well as the particular form of truck, forms the subject of separate applications filed June 18, 1930, under Serial No. 462,009, and filed June 20, 1930, Serial No. 462,609.

In the present instant the improved draw bar is shown in connection with the particular form of frame and truck, although the draw bar can be used on other frames and trucks without departing from the essential features of the invention.

I claim:

1. The combination in a locomotive, of a main frame having a rear extension terminating at the rear of the locomotive and having a foot plate and draw head having abutments; a truck mounted under the extension of the frame and pivoted to the frame; a draw bar also pivoted to the main frame and extending through the draw head, and having projections arranged to engage the abutments of the draw head, said truck having a center pin extending through the extension of the frame, and extending into an elongated opening in the draw bar.

2. The combination of a main frame of a locomotive; a rear truck pivoted to the main frame; a draw bar pivotally connected to the said main frame, directly back of the driving wheels and extending over the rear truck and projecting at the rear, and having means whereby it can be coupled to the tender of the locomotive, said bar having an opening directly above the center of the truck; and a center pin coupling the truck to the draw bar and extending through said opening in the bar.

3. The combination of a main frame of a locomotive, having a rear extension terminating in a foot plate at the rear of the locomotive, said foot plate having projections; a draw bar pivoted to the main frame and extending through the foot plate and projecting beyond the end of the frame and arranged to be coupled to the tender of the locomotive, said draw bar having abutments engaging the projections of the foot plate to prevent buckling of that portion of the draw bar between the abutments and the pivot of the draw bar.

4. The combination of a main frame having a rear extension terminating at the rear of the locomotive in a foot plate; projections under the foot plate; and a draw bar pivoted to the main frame of the locomotive and extending under the foot plate and beyond the end of the locomotive and shaped at its rear end to be coupled to the tender of the locomotive, said draw bar having abutments arranged to engage the projections on the frame at the foot plate, that portion of the draw bar extending beyond the abutments being heavier than that portion of the bar between its pivot and the abutments, said abutments preventing the buckling of that portion of the draw bar between the abutments and the pivot.

5. The combination of a main frame having a rear extension terminating in the foot plate at the rear of the locomotive and having upper and lower projections and also having a vertical extension some distance back of one of the projections; and a draw bar pivoted to the main frame and extending through the space between the upper and lower projections of the frame at the foot plate and having a rear end shaped to be coupled to the tender of a locomotive, said draw bar having upper and lower abutments arranged to engage the projections on the frame to prevent buckling of that portion of the draw bar between the abutments and the pivot of the bar, the vertical extension on the frame projecting back of the lower abutment of the draw bar, said vertical extension acting as a safety device in the event of the draw bar breaking between the abutments and the point where the said bar is pivoted to the main frame of the locomotive.

6. The combination in the frame of a locomotive, of a main frame having a rear extension terminating in a draw head, the said extension having a radial slot therein; a truck pivoted to the main frame of the locomotive and extending to the rear extension of the frame and having a pivot pin at a point near the center of the truck, said pivot pin extending through the radial slot in the frame; and a draw bar pivoted to the main frame and extending over the extension of said frame and through the draw head, and arranged to be coupled to a tender of the locomotive, said draw bar having an opening therein through which the pivot pin extends, said opening being elongated laterally to allow a certain amount of play between the pivot pin and the draw bar.

7. An elongated draw bar for a locomotive, having an opening for a pivot pin at its forward end by which it can be coupled to the main frame of the locomotive directly back of the driving wheels and having at its rear end an opening for a coupling pin, by which it can be connected to a tender of a locomotive, and having an abutment some distance from its rear end arranged to engage a projection on the rear end of the locomotive frame and having a laterally elongated opening midway between the opening for the pivot pin and the abutment, said bar being heavier at its rear end beyond the abutment than between the abutment and its pivot opening.

MENAHEM RIVKIN.